(12) United States Patent
Hoffman et al.

(10) Patent No.: US 9,473,764 B2
(45) Date of Patent: Oct. 18, 2016

(54) STEREOSCOPIC IMAGE DISPLAY

(71) Applicant: MICROSOFT TECHNOLOGY LICENSING, LLC, Redmond, WA (US)

(72) Inventors: Craig Lee Hoffman, Sammamish, WA (US); Richard Carl Roesler, Bellevue, WA (US); Travis William Steiner, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 98 days.

(21) Appl. No.: 14/318,451

(22) Filed: Jun. 27, 2014

(65) Prior Publication Data
US 2015/0381974 A1 Dec. 31, 2015

(51) Int. Cl.
G06T 15/00 (2011.01)
H04N 13/04 (2006.01)
G02B 27/01 (2006.01)
H04N 13/00 (2006.01)
G06T 19/00 (2011.01)
H04N 13/02 (2006.01)

(52) U.S. Cl.
CPC ........ *H04N 13/0429* (2013.01); *G02B 27/017* (2013.01); *G02B 27/0179* (2013.01); *G06T 19/006* (2013.01); *H04N 13/0018* (2013.01); *H04N 13/0278* (2013.01); *H04N 13/044* (2013.01); *H04N 13/0409* (2013.01); *H04N 13/0484* (2013.01); *G02B 2027/0178* (2013.01); *G02B 2027/0187* (2013.01); *H04N 13/0033* (2013.01); *H04N 2013/0096* (2013.01)

(58) Field of Classification Search
CPC .................. G02B 27/017; G02B 2027/0178; G02B 2027/0127; G06F 3/012; G06F 3/011
See application file for complete search history.

(56) References Cited

U.S. PATENT DOCUMENTS 7,929,189 B2 4/2011 Schwerdtner
8,395,616 B2 3/2013 Schwerdtner
2010/0149313 A1 6/2010 Kroll et al.
(Continued)

FOREIGN PATENT DOCUMENTS

EP 2458880 A2 5/2012
WO 2013145861 A1 10/2013

OTHER PUBLICATIONS

ISA European Patent Office, Invitation to Pay Additional Fees and, Where Applicable, Protest Fee Issued in Application No. PCT/US2015/037306, Sep. 14, 2015, WIPO, 6 pages.
(Continued)

*Primary Examiner* — Peter Hoang
(74) *Attorney, Agent, or Firm* — Dan Choi; Micky Minhas

(57) ABSTRACT

Embodiments that relate to displaying a computer generated image to a viewer via a stereoscopic display system are disclosed. One disclosed embodiment comprises establishing a predetermined threshold distance from an eye of a viewer to a threshold displayed position of a computer generated image. The method includes determining that a vergence distance from the eye of the viewer to a current displayed position of the image is at or below the predetermined threshold distance. Based on the vergence distance being at or below the predetermined threshold distance, a size of the image is increased while maintaining the vergence distance at the predetermined threshold distance as the eye of the viewer moves toward the image.

20 Claims, 9 Drawing Sheets

(56) References Cited

U.S. PATENT DOCUMENTS

| | | |
|---|---|---|
| 2010/0149611 A1 | 6/2010 | Leister |
| 2011/0267338 A1 | 11/2011 | Nam et al. |
| 2013/0050258 A1 | 2/2013 | Liu et al. |
| 2013/0093848 A1 | 4/2013 | Masuda |
| 2013/0201446 A1 | 8/2013 | Hall et al. |
| 2013/0326364 A1 | 12/2013 | Latta et al. |
| 2015/0070477 A1 | 3/2015 | Taki |

OTHER PUBLICATIONS

ISA European Patent Office, International Search Report and Written Opinion Issued in Application No. PCT/US2015/037306, Nov. 20, 2015, WIPO, 19 pages.

Onural, et al., "Digital Holographic Three-Dimensional Video Displays", In Proceedings of the IEEE, vol. 99 , Issue 4, Apr. 2011, 14 pages.

Kozacki, Tomasz, "On Resolution and Viewing of Holographic Image Generated by 3D Holographic Display", In Proceedings of the Optics Express, vol. 18, Issue 26, Dec. 9, 2010, 12 pages.

Halle, et al., "The Ultragram: A Generalized Holographic Stereogram", In Proceedings of the SPIE Practical Holography V, Feb. 1991, 13 pages.

Nishchal, et al., "Reconstruction of Fresnel Digital Hologram Using Fractional Fourier Transform Algorithm", Published on: Dec. 6, 2013, Available at: http://www.digitalholography.eu/varasto/Nishchal_Naughton_Photonics_2010.pdf.

IPEA European Patent Office, Second Written Opinion issued in Application No. PCT/US2015/037306, Mar. 30, 2016, WIPO, 8 pages.

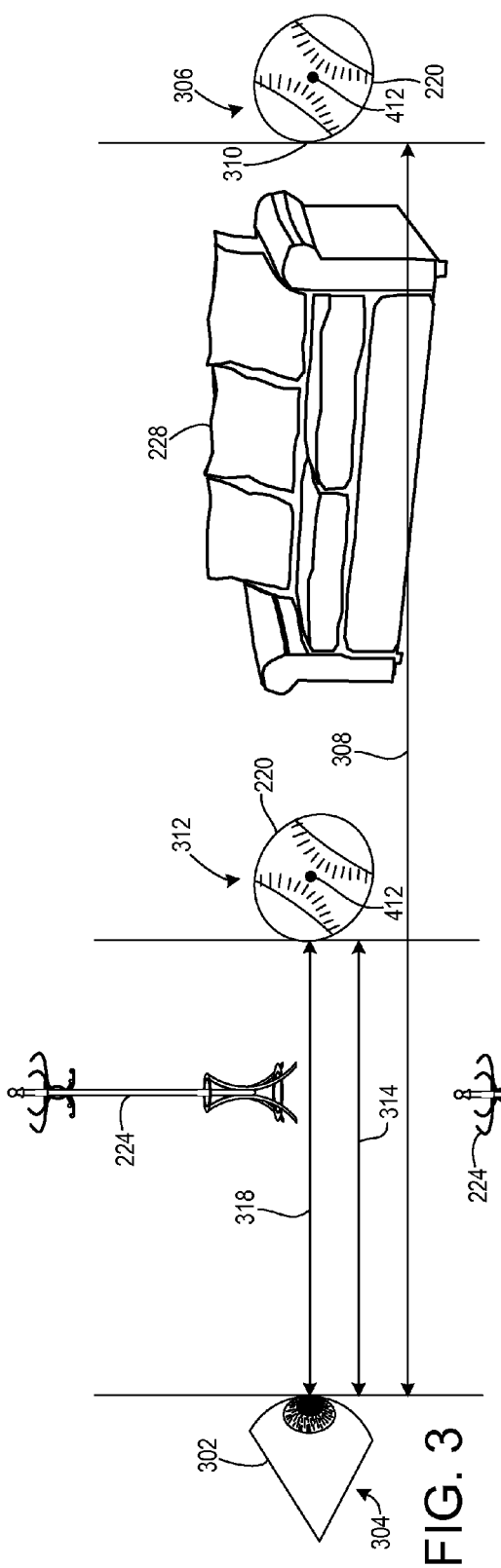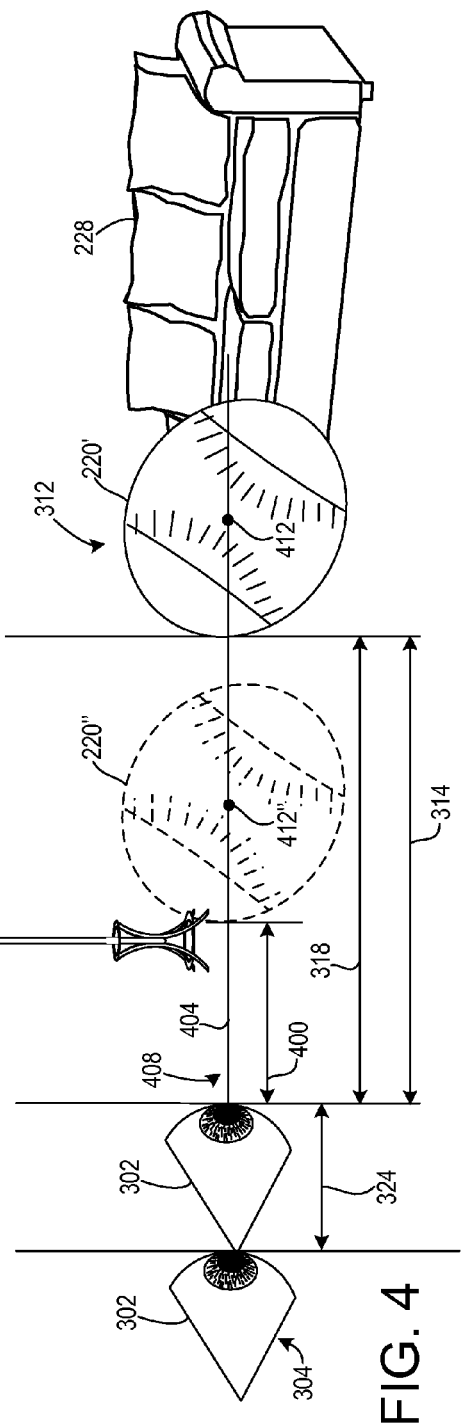

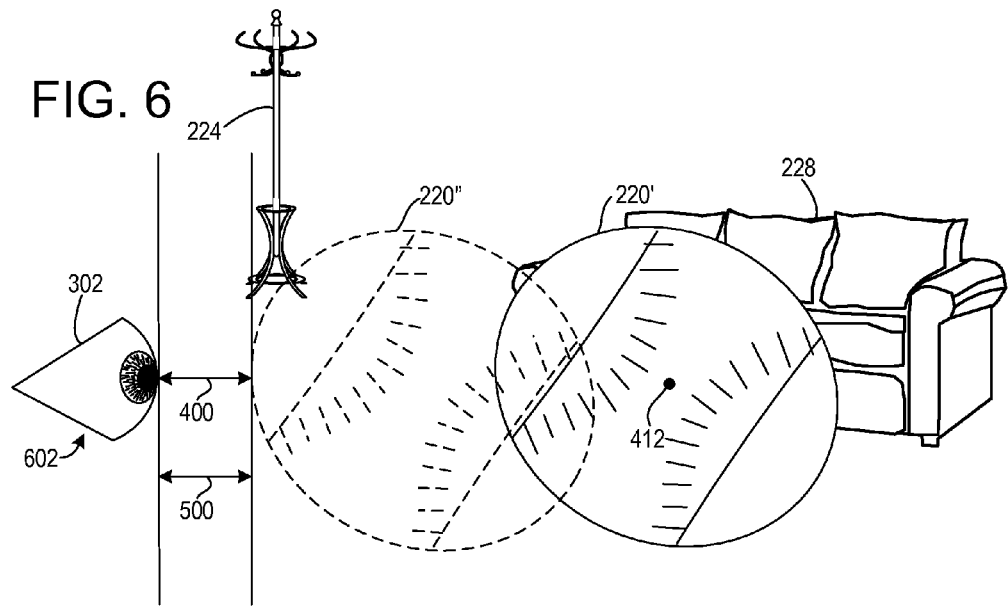
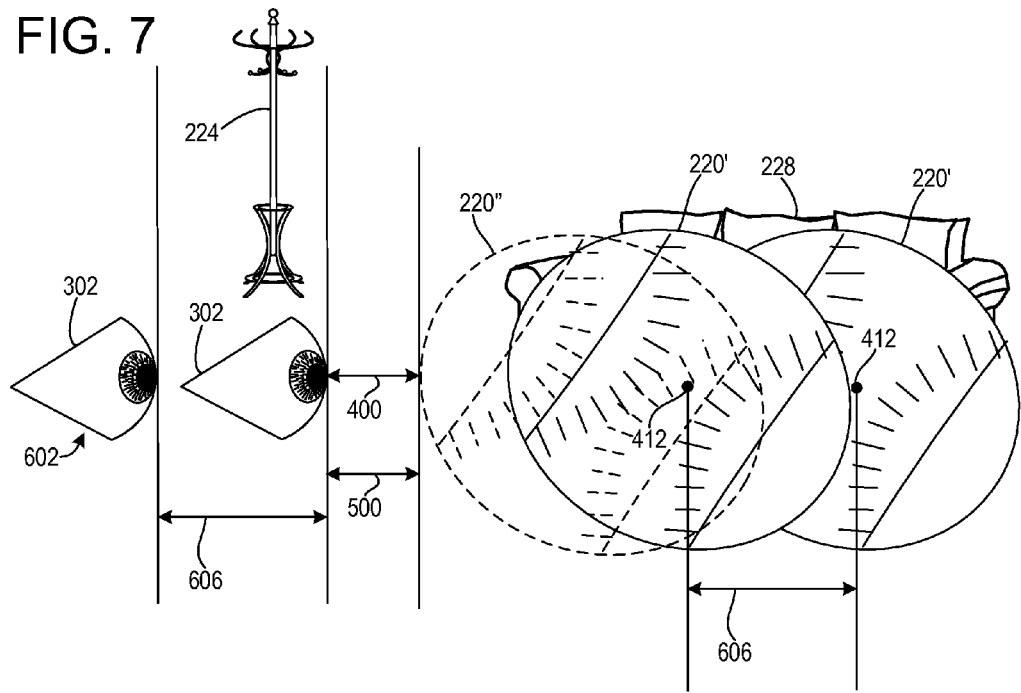

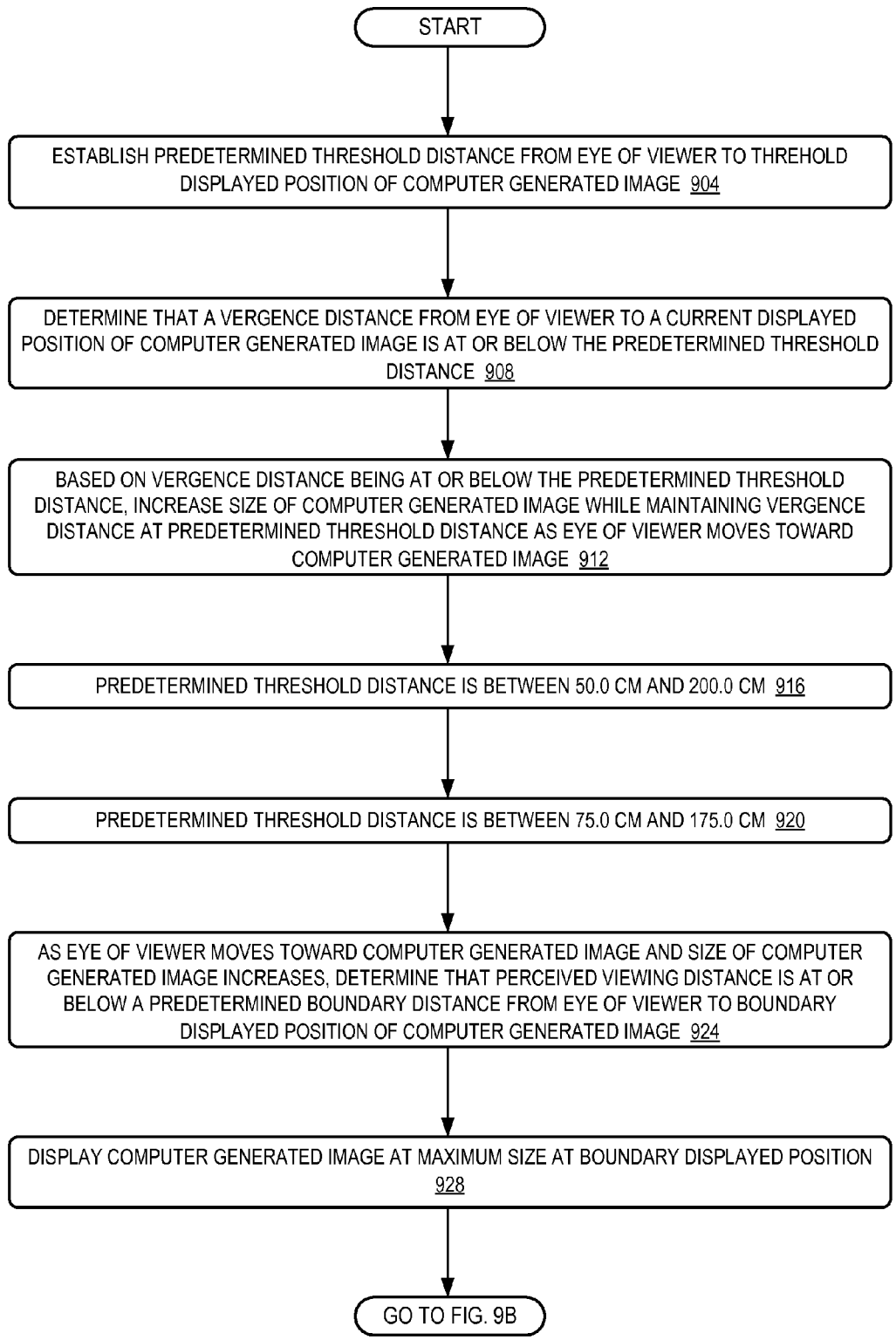

STEREOSCOPIC IMAGE DISPLAY

BACKGROUND

Various display technologies may display computer generated images, such as three-dimensional holograms or two-dimensional images, to create an immersive virtual reality or augmented reality viewing experience. For example, some stereoscopic display devices, such as head-mounted display (HMD) devices, may comprise a see-through display that allows superposition of images over a real-world environment. The images may appear integrated with the real-world environment when viewed through the see-through display of the HMD device. Such a relationship between virtual images and the real-world environment may be referred to as augmented reality.

Where an image is generated by a stereoscopic display, light comprising the image originates at a display screen or other surface and travels to the eyes of the viewer over an actual viewing distance. In some examples, the light may be controlled to create a viewer-perceived location of the image at a distance from the viewer that is different from the actual viewing distance of the display screen or surface. For example, an HMD device displays images that are perceived by the viewer to be at distance from the viewer's eyes that is greater than the eye relief distance between eyes and the HMD screen or lens.

In some examples, a viewer may approach a computer generated image to appreciate image details or otherwise interact with the image. In other examples an image may be displayed to move closer to the viewer. It has been discovered, however, that as the distance between the viewer and a perceived location of the image decreases, at certain distances some viewers may experience discomfort such as dizziness, headaches, double vision and/or other issues. Because of these viewer comfort issues, some display devices may impose a minimum viewing distance that limits the perceived proximity of a displayed image. Unfortunately, such minimum viewing distances may prevent viewers from more closely approaching an image, and may thereby limit interactive experiences and related features of augmented or virtual reality applications. Additionally, such minimum viewing distances negatively impact the viewing experiences of viewers who are not affected by viewing comfort issues.

SUMMARY

Various embodiments are disclosed herein that relate to displaying a computer generated image to a viewer via a stereoscopic display system. For example, one disclosed embodiment provides a method comprising establishing a predetermined threshold distance from an eye of the viewer to a threshold displayed position of the computer generated image. The method includes determining that a vergence distance from the eye of the viewer to a current displayed position of the computer generated image is at or below the predetermined threshold distance. Based on the vergence distance being at or below the predetermined threshold distance, a size of the computer generated image is increased while maintaining the vergence distance at the predetermined threshold distance as the eye of the viewer moves toward the computer generated image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 schematically shows a computer generated image at two viewer-perceived distances from an eye of a viewer.

FIG. 4 schematically shows a computer generated image of FIG. 3 increased in size as the eye of the viewer moves toward the image.

FIGS. 6 and 7 schematically show the computer generated image of FIG. 5 translated relative to stationary real-world objects as the viewer's eye moves toward the image.

FIGS. 9A and 9B are a flow chart of a method for displaying a computer generated image to a viewer via a stereoscopic display system according to an embodiment of the present disclosure.

DETAILED DESCRIPTION

Figure 1:
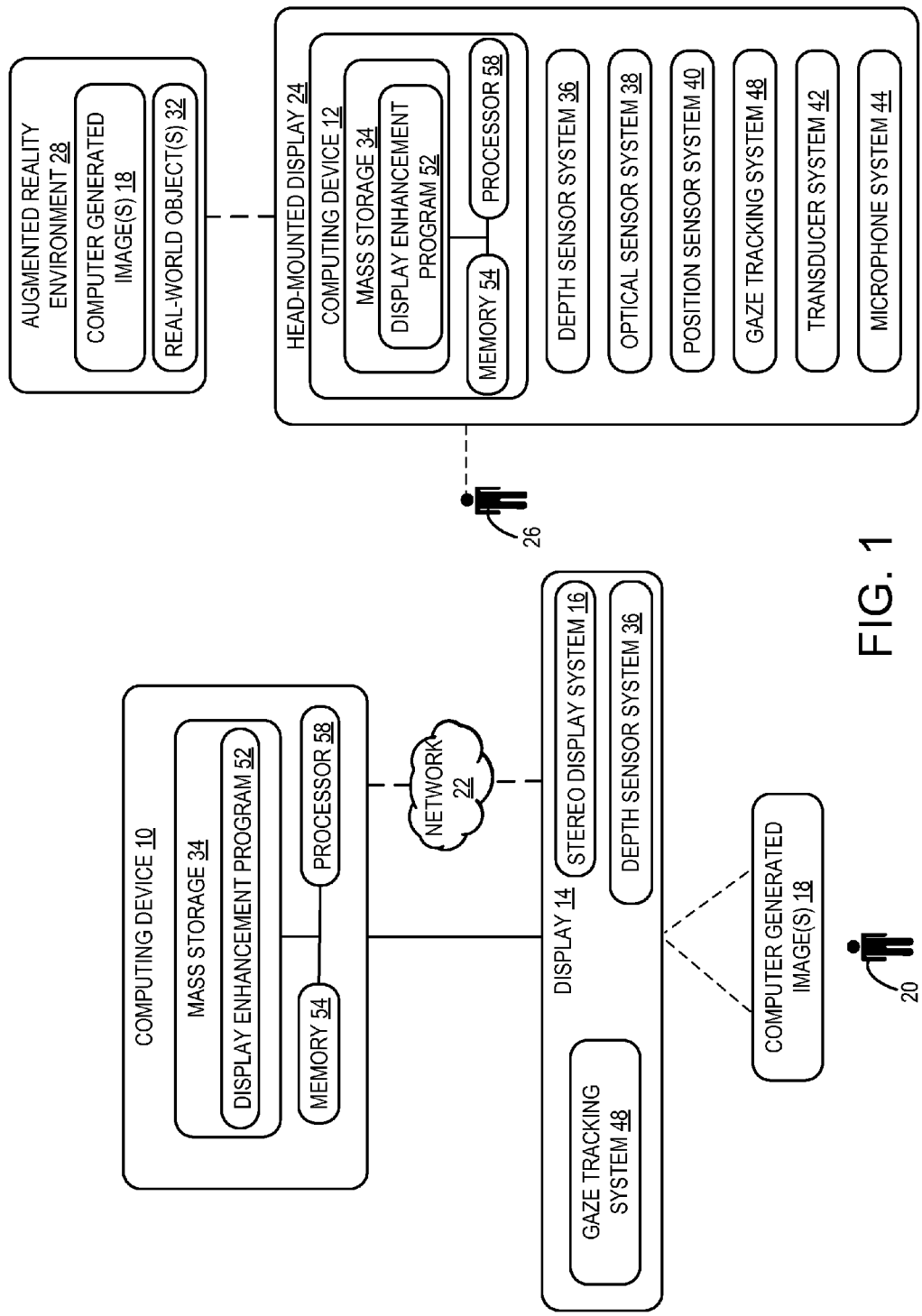
FIG. 1 is a schematic view of example display devices that may display computer generated images via stereoscopic display systems according to examples of the present disclosure.

FIG. 1 shows a schematic view of example implementations of computing devices and associated stereoscopic display devices that may be utilized to display computer generated images to a viewer. As described in more detail below, in one example a display enhancement program executed by a processor of a computing device may establish a predetermined threshold distance from an eye of the viewer to a threshold displayed position of a computer generated image. The program may determine that a vergence distance from the eye of the viewer to a current displayed position of the computer generated image is at or below the predetermined threshold distance. Based on the vergence distance being at or below the predetermined threshold distance, and as the eye of the viewer moves toward the computer generated image, the size of the computer generated image may be increased while maintaining the vergence distance at the predetermined threshold distance.

In various examples, the computing devices may be either physically separated from or integrated into a display device with which a viewer may interact. FIG. 1 schematically shows an example of a computing device 10 that is physically separated from a stereoscopic display device 14. The display device 14 may include a stereoscopic display system 16 for presenting one or more computer generated images 18 to a first viewer 20. In this example, the computing device 10 may comprise or be integrated into a separate device, such as a set-top box, gaming console, web camera, head-mounted computing device or other wearable computing device, keyboard, dedicated peripheral, or other like device that does not include an integrated display.

The computing device 10 may be operatively connected with the display device 14 using a wired connection, or may employ a wireless connection via WiFi, Bluetooth, or any other suitable wireless communication protocol. For example, the computing device 10 may be communicatively coupled to a network 22. The network 22 may take the form of a local area network (LAN), wide area network (WAN), wired network, wireless network, personal area network, or a combination thereof, and may include the Internet. Additional details regarding the components and computing aspects of the computing device 10 are described in more detail below with reference to FIG. 10.

FIG. 1 also shows an example of a computing device 12 that is integrated into a head-mounted display (HMD) device 24. The HMD device 24 may comprise a transparent, semi-transparent or non-transparent display that is supported in front of a viewer's eye or eyes. In some examples, the HMD device 24 may create and display to a second viewer 26 an augmented reality environment 28 that includes one or more computer generated images 18 that are displayed among one or more real-world objects 32 in a physical environment viewed through the device. The computer generated images 18 may comprise three-dimensional (3D) holographic images, two-dimensional (2D) images, or other forms of virtual images that are generated and displayed via HMD device 24. The HMD device 24 may thereby enable the second viewer 26 to view such computer generated images 18 within the physical environment surrounding the viewer.

As described in more detail below, the HMD device 24 may include various sensors and related systems that receive physical environment data from the physical environment. For example, the HMD device 24 may include a depth sensor system 36 that includes one or more depth cameras that generate depth image data from real-world objects 32 in the surrounding physical environment. In some examples the HMD device 24 may include an optical sensor system 38 that utilizes at least one outward facing sensor, such as an RGB camera or other optical sensor. The outward facing sensor may capture two-dimensional image information from real-world objects 32 in the physical environment. The HMD device 24 may also include a position sensor system 40 comprising one or more accelerometers, gyroscopes, head tracking systems, and/or other sensors for determining a position or orientation of a user.

In some examples the HMD device 24 may include a transducer system 42 comprising one or more actuators that convert an electrical signal into another form of energy. The transducer system 42 may include one or more speakers for providing audio feedback to a viewer. In other examples the transducer system 42 may include one or more tactile transducers for generating and providing haptic feedback to the viewer, such as vibrations. The HMD device 24 may also include a microphone system 44 and one or more microphones for receiving audio input from the physical environment.

The example HMD device 24 illustrated in FIG. 1 shows the computing device 12 integrated into the HMD device. It will be appreciated that in other examples the computing device 12 may be a separate component from the HMD device 24. Many types and configurations of HMD devices 24 having various form factors also may be used and are within the scope of the present disclosure. A more detailed description of an example HMD device is provided below with reference to FIG. 8.

It also will be appreciated that the computing device 12 may comprise or be integrated into any other suitable type or form of display device or other computing device, such as a tablet, notebook, smartphone, or other mobile computing device, desktop computing device, standalone monitor, wall-mounted display, interactive whiteboard, or other like device having an integrated stereoscopic display.

Computing device 10 and computing device 12 also may receive gaze tracking data from a gaze tracking system 48. In various examples the gaze tracking system 48 may be located in display device 14, HMD device 24, or in a common enclosure with any other suitable type or form of display device, including but not limited to those example devices having an integrated display discussed above. In other examples, a gaze tracking system 48, depth sensor system 36 and computing device may be integrated into a common enclosure that does not include an integrated display, such as a head-mounted or other wearable device, or in any other suitable type or form of computing device that does not include an integrated display, including but not limited to those example devices without an integrated display discussed above. More detailed descriptions of example gaze tracking systems 48 are discussed below with reference to example HMD device 800 illustrated in FIG. 8.

Both computing device 10 and computing device 12 may include a display enhancement program 52 that may be stored in mass storage 34. The display enhancement program 52 may be loaded into memory 54 and executed by a processor 58 to perform one or more of the methods and processes described in more detail below.

In some examples, the display enhancement program 52 may utilize at least two different display modes for displaying the computer generated images 18. More particularly, in a world-lock display mode one or more computer generated images 18 may be displayed via the display device 14 or HMD device 24 with world-locked positions. In a world-locked position, a computer generated image 18 appears to be fixed relative to real-world objects 32 viewable via the display device 14 or HMD device 24. Correspondingly, in this mode the world-locked position of each computer generated image 18 appears to be moveable relative to a wearer of the HMD device 24.

In some examples of HMD device 24, a world-lock display mode may be associated with a six degree of freedom (6DOF) tracking system that estimates a location and an orientation of the HMD device 24 in six degrees of freedom (e.g., x, y, z, pitch, roll, yaw). For example, the estimate in six degrees of freedom may be determined using sensor data from optical sensor system 38, position sensor system 40, and or other sensors of the HMD device 24.

In other examples, the HMD device 24 and/or display device 14 may operate in a body-lock display mode in which one or more computer generated images 18 may be displayed with body-locked positions. In a body-locked position, a computer generated image 18 appears to be fixed relative to the viewer, and the body-locked position of each computer generated image appears to be moveable relative to the real-world objects 32.

In some examples of HMD device 24, a body-lock display mode may be associated with a three degree of freedom (3DOF) tracking system that may operate in parallel with a 6DOF tracking system. The 3DOF tracking system may estimate an orientation of the HMD device 24 in three degrees of freedom (e.g., pitch, roll, yaw). For example, the estimate in three degrees of freedom may be determined using data from the position sensor system 40.

Figure 2:
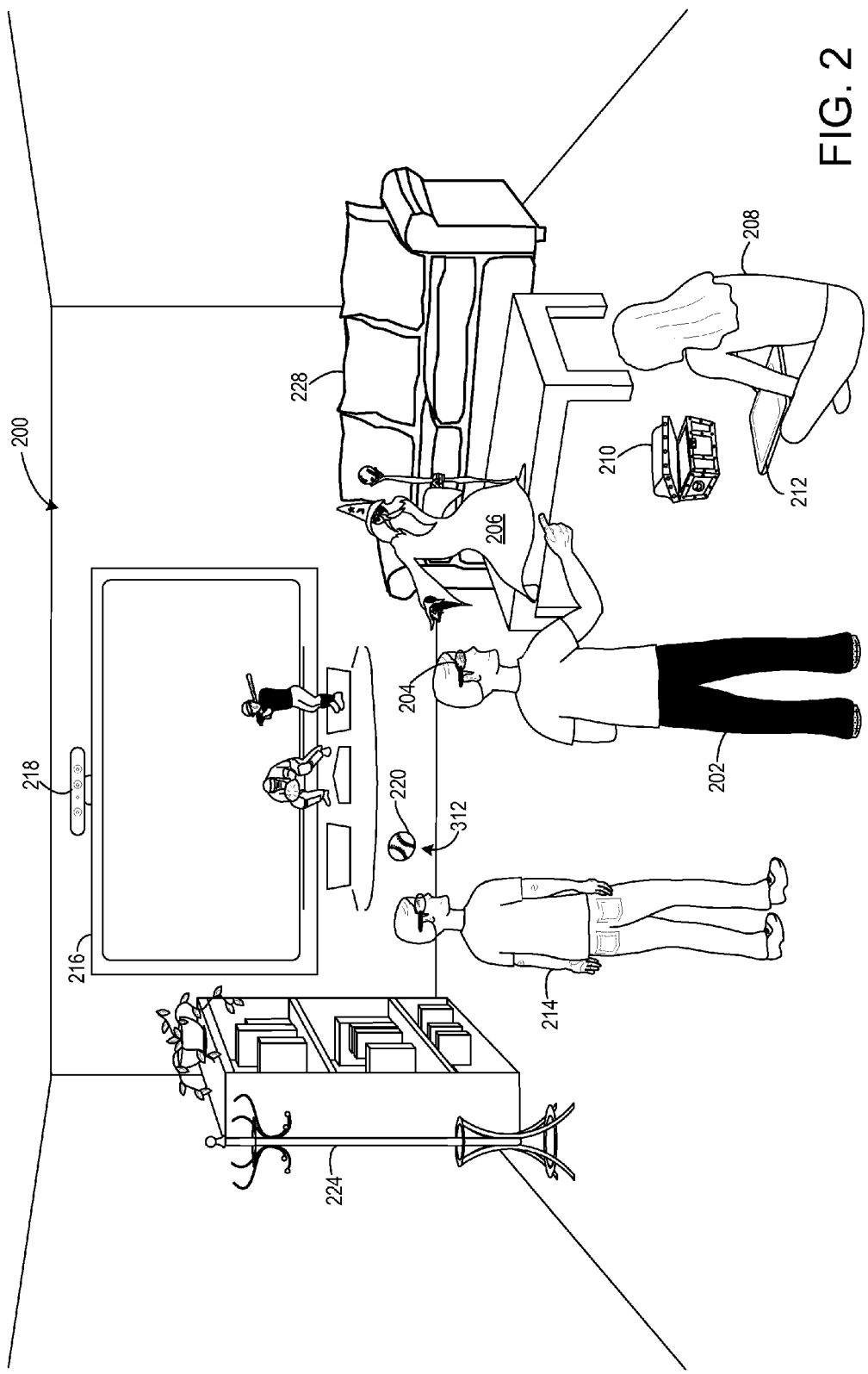
FIG. 2 is a schematic view of viewers in a room interacting with display devices that may display computer generated images via a stereoscopic display system according to examples of the present disclosure.

With reference now to FIGS. 2-7, example use cases of display device 14 and HMD device 24 will now be described. FIG. 2 is a schematic illustration of several viewers in a room 200 interacting with computing devices and associated stereoscopic display devices that display computer generated images via a display enhancement program 52. In one example, viewer Galen 202 is wearing an HMD device 204 that is generating an augmented reality movie including a 3D holographic wizard 206. In another example, viewer Kara 208 is playing a treasure hunt game that includes a 3D holographic treasure chest 210 displayed by her laptop 212.

In another example, viewer Meb 214 is playing a 3D interactive baseball game that is displayed by a wall-mounted display 216. In some examples viewer Meb 214 may wear glasses that assist in creating an augmented reality experience by, for example, fusing two images into a single 3D image that is perceived by Meb to float in space.

In this example, wall-mounted display 216 is communicatively coupled to a set-top box 218 that comprises a depth sensor system 36, a gaze tracking system 48 and a computing device that includes display enhancement program 52. Using data from the depth sensor system 36 the set-top box 218 may monitor the position of viewer Meb 214 within room 200. Using gaze tracking data from the gaze tracking system 48, the set-top box 218 may also monitor viewer Meb's gaze location with respect to real-world objects within the room 200 and 3D images generated by the baseball game and displayed via the wall-mounted display 216.

In one example, a 3D spherical computer generated baseball image 220 may be displayed in a world-lock display mode as floating stationary in space between viewer Meb 214 and computer generated images of a batter, catcher and home plate. In this manner, as viewer Meb 214 changes his position in the room 200, Meb perceives the baseball image 220 as remaining stationary with respect to the wall-mounted display 216, coat rack 224, couch 228 and other real-world objects in room 200.

With reference now to FIGS. 3 and 4, an eye 302 of viewer Meb 214 is schematically illustrated in relation to the coat rack 224 and couch 228 in room 200. As shown in FIG. 3 and with the eye 302 at an initial location 304, a first current displayed position 306 of the baseball image 220 as perceived by viewer Meb 214 may be across the room at a first, relatively large vergence distance 308 from eye 302. In the present example, the first vergence distance 308 may be further defined as the distance between the eye 302 and a point 310 at which the eye is gazing on the baseball image 220 in the first current displayed position 306. In other examples, a vergence distance may be defined as the distance between the eye of a viewer and a predetermined location associated with the image, such as a leading edge of the image closest to the eye, a center of the image, or any other suitable location associated with the image.

With reference also to FIG. 2, the baseball image 220 may be displayed at a second current displayed position 312 as perceived by viewer Meb 214 that is located at a second vergence distance 314 that is closer to his eye 302. As noted above and to avoid potential viewer discomfort issues, the display enhancement program 52 may establish a predetermined threshold distance 318 from viewer Meb's eye 302 to a threshold displayed position of the baseball image 220. In the present example and as shown in FIG. 3, the second current displayed position 312 of baseball image 220 is located at the predetermined threshold distance 318 from eye 302. Accordingly, the second current displayed position 312 corresponds to the threshold displayed position.

When the baseball image 220 is displayed at the second current displayed position 312, the display enhancement program 52 may determine that the second vergence distance 314 is at the predetermined threshold distance 318. It will also be appreciated that in some examples, due to processing limitations, data sampling intervals, and/or other constraints, the display enhancement program 52 may determine that the second vergence distance 314 is below the predetermined threshold distance 318. For example, where viewer Meb 214 is moving toward the baseball image 220, the display enhancement program 52 may not determine the second vergence distance 314 until the distance is slightly below the predetermined threshold distance 318. In these examples, the display enhancement program may then adjust the second vergence distance 314 to match the predetermined threshold distance 318.

Returning to the example of FIG. 3, and with the baseball image 220 at the second current displayed position 312, viewer Meb 214 may desire to obtain a closer view of the image. Accordingly and with reference now also to FIG. 4, viewer Meb 214 may move toward the baseball image by a translation distance 324. Because the second vergence distance 314 is at the predetermined threshold distance 318, and in one potential advantage of the present disclosure, the display enhancement program 52 may maintain the second vergence distance constant while increasing a displayed size of the baseball as viewer Meb's eye 302 moves toward the displayed image over translation distance 324. Accordingly and as discussed in more detail below, the display enhancement program 52 thereby enables viewer Meb 214 to view a magnified baseball while also avoiding potential viewer comfort issues by maintaining the second vergence distance 314 constant.

More particularly and as schematically illustrated in FIG. 4, by generating a displayed enlarged baseball image 220' at the second displayed position 312 relative to eye 302, the display enhancement program 52 causes viewer Meb 214 to perceive the displayed enlarged baseball image 220' as being located at a reduced perceived viewing distance 400 that is less than the predetermined threshold distance 318, with such perception illustrated by the perceived enlarged baseball image 220". Accordingly, as viewer Meb 214 moves toward the baseball image and the image is progressively enlarged, he perceives himself approaching the enlarging image.

Additionally, as viewer Meb 214 may now discern details of the enlarged baseball image 220' that may not have been discernable in the smaller baseball image 220, the illusion of moving closer to the enlarging image is strengthened. In this manner, the display enhancement program 52 enables viewer Meb 214 to experience the enlarged baseball image 220' as if it were actually located at the reduced perceived viewing distance 400 (as illustrated by perceived enlarged baseball image 220"), while also avoiding potential viewer comfort issues by maintaining the second vergence distance 314 constant.

In some examples, the predetermined threshold distance 318 may be between 50.0 cm and 200.0 cm. In other examples, the predetermined threshold distance 318 may be between 75.0 cm and 175.0 cm. In other examples the predetermined threshold distance 318 may be 100 cm. It will be appreciated that the predetermined threshold distance may be established based on one or more of the display device type and display technology being utilized, properties of the computer generated image that is displayed, viewer preferences received by the display enhancement program 52, and environmental conditions such as ambient lighting.

In some examples and with reference to FIG. 4, the display enhancement program 52 may determine an axis 404 that extends along a line of sight 408 of viewer Meb 214 and through a pivot point 412 of the baseball image 220. Increasing the size of the baseball image 220 may comprise scaling the image about the axis 404. In one example and as schematically illustrated in FIG. 4, the pivot point 412 of the baseball image 220 may be located at a center of the 3D spherical shape of the image. In this example, as viewer Meb 214 approaches the baseball image 220, the illusion that Meb is getting closer to the image is created by scaling the image about the axis 404.

In one example and as the eye 302 of viewer Meb moves toward the baseball image 220 in FIGS. 3 and 4, the display enhancement program 52 may uniformly scale the image in linear proportion to the translation distance 324 of the eye toward the image. In this manner, the display enhancement program 52 may create a smooth zooming effect as the baseball image 220 begins to increase in size after the predetermined threshold distance 318 has been reached. Advantageously, the display enhancement program 52 may thereby create for viewer Meb 214 a realistic perception of moving closer to the enlarged baseball image 220', while also maintaining the predetermined threshold distance 318 of the displayed image.

For example, as the eye 302 moves toward the baseball image 220, the size of the image may be uniformly increased by a fixed percentage in linear proportion to the translation distance 324 traversed by the eye. In one example, the size of the image may be uniformly increased at a rate of 5% for each 1 cm of translation of the eye 302 toward the baseball image 220. It will be appreciated that any suitable rate of size increase may be utilized and is within the scope of the present disclosure.

In another example, the rate of size increase of the baseball image 220 may directly correspond to the ratio between the predetermined threshold distance 318 and the distance between the eye 302 and a pivot point 412" of the perceived enlarged baseball image 220". For example and with reference to FIG. 3, when the baseball image 220 is displayed in the second current displayed position 312, the display enhancement program 52 may display the image in a default size as shown in FIG. 3.

With reference now to FIG. 4, when the position of eye 302 reaches the second vergence distance 314 and the eye moves further toward the baseball image 220, the default size of the baseball image 220 may be increased by the ratio between the predetermined threshold distance 318 and the distance between the eye 302 and the pivot point 412" of the perceived enlarged baseball image 220". It will be appreciated that as the distance between the eye 302 and the pivot point 412" of the perceived enlarged baseball image 220" decreases, the default size of the image is linearly scaled to create the illusion of the eye moving closer to the image.

In other examples, increasing the size of the baseball image 220 may comprise proportionally scaling the image at a ratio other than 1:1 relative to translation of the eye 302 of viewer Meb 214 toward the image. In one example, the size of the baseball image 220 may be increased at a rate of 4% over the first 1 cm of translation of the eye 302 toward the baseball image 220, 6% over the next 1 cm of translation of the eye 302, 8% over the next 1 cm of translation, and 10% over the remaining translation distance. It will be appreciated that any suitable distance intervals and corresponding size increase percentages may be utilized and are within the scope of the present disclosure.

Figure 5:
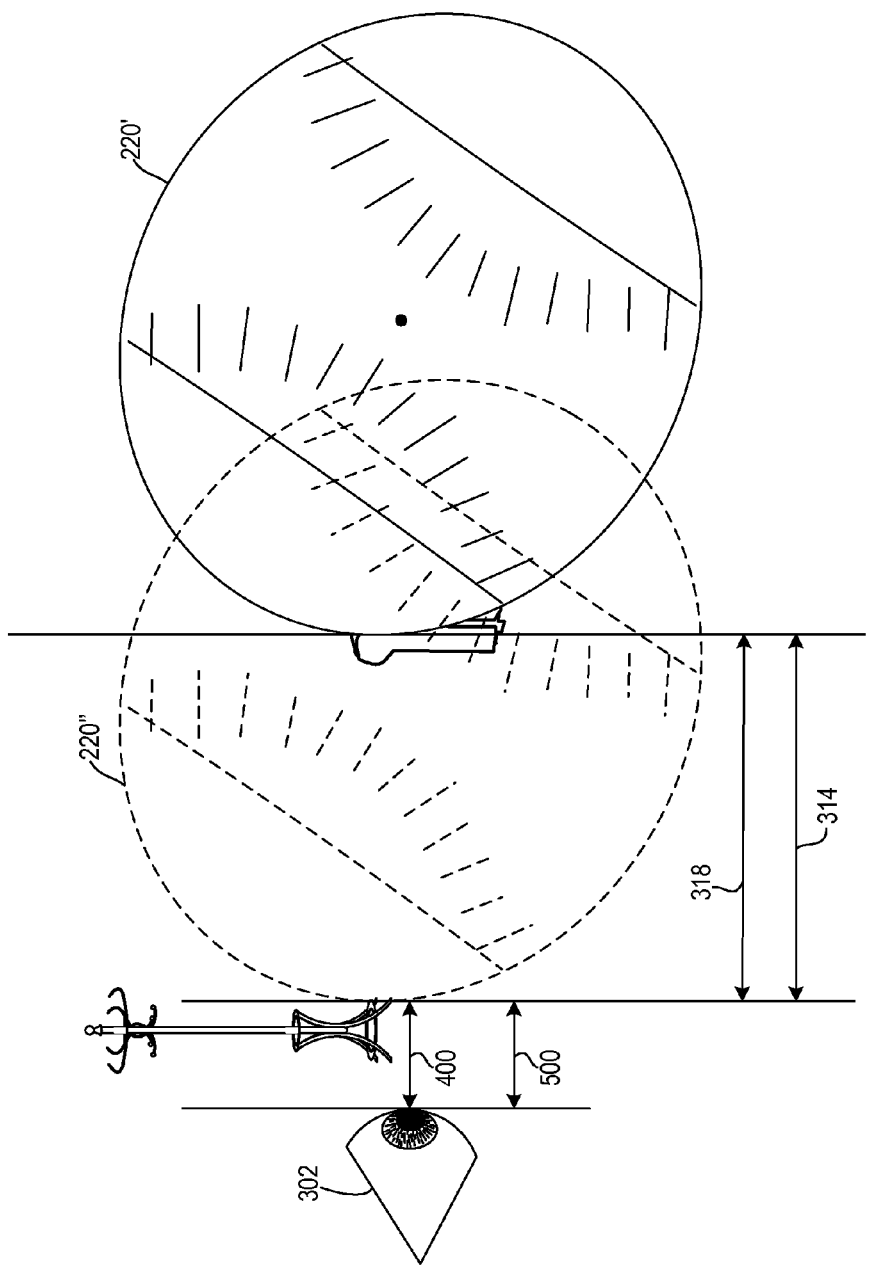
FIG. 5 schematically shows the computer generated image of FIG. 4 displayed at a maximum size when the perceived viewing distance is at a predetermined boundary distance.

With reference now to FIG. 5, in some examples the display enhancement program 52 may establish a predetermined boundary distance 500 that corresponds to a minimum perceived viewing distance between the eye 302 and the perceived enlarged baseball image 220". As schematically illustrated in FIG. 5, the eye 332 may move toward the enlarged baseball image 220' and the size of the image may be increased until the reduced perceived viewing distance 400 reaches the predetermined boundary distance 500. Upon determining that the reduced perceived viewing distance 400 is at the predetermined boundary distance 500, the display enhancement program 52 may display the enlarged baseball image 220" at a maximum size.

It will also be appreciated that in some examples, due to processing limitations, data sampling intervals, and/or other constraints, the display enhancement program 52 may determine that the reduced perceived viewing distance 400 is below the predetermined boundary distance 500. In these examples, the display enhancement program may then adjust the reduced perceived viewing distance 400 to match the predetermined boundary distance 500.

In some examples, the predetermined boundary distance 500 may be between 0.5 cm and 4.0 cm. In other examples, the predetermined boundary distance 500 may be between 0.75 cm and 1.25 cm. In other examples, the predetermined boundary distance 500 may be 1.0 cm. It will be appreciated that the predetermined boundary distance may be established based on one or more of the display device type and display technology being utilized, properties of the computer generated image that is displayed, viewer preferences received by the display enhancement program 52, and environmental conditions such as ambient lighting.

With reference now to FIGS. 6 and 7, in some examples viewer Meb 214 may continue moving toward the enlarged baseball image 220' after the reduced perceived viewing distance 400 is at the predetermined boundary distance 500. In one example, based on the reduced perceived viewing distance 400 being at or below the predetermined boundary distance 500, and as the eye 302 moves from an initial position 602 toward the enlarged baseball image 220', the display enhancement program 52 may translate the image 220' relative to stationary real-world objects, such as the coat rack 224 and couch 228, while maintaining the reduced perceived viewing distance at the predetermined boundary distance and maintaining the maximum size of the image.

In this example, the display enhancement program 52 may change the display mode of the enlarged baseball image 220' from a world-lock display mode to a body-lock display mode. Accordingly and as schematically illustrated in FIGS. 6 and 7, movement of the eye 302 over a translation distance 606 causes a corresponding translation of the enlarged baseball image 220' by the translation distance 606. In this manner, viewer Meb 214 perceives the perceived enlarged baseball image 220" as being in a fixed position relative to his eye 302 and body such that movement toward the image results in a corresponding movement of the image relative to the coat rack 224 and couch 228.

In some situations, viewer Meb 214 may move in a direction away from the enlarged baseball image 220' such that the reduced perceived viewing distance 400 grows larger than the predetermined boundary distance 500. In some examples, as the reduced perceived viewing distance 400 grows larger than the predetermined boundary distance 500, the display enhancement program 52 may change the display mode of the enlarged baseball image 220' from the body-lock display mode to the world-lock display mode.

Figure 8:
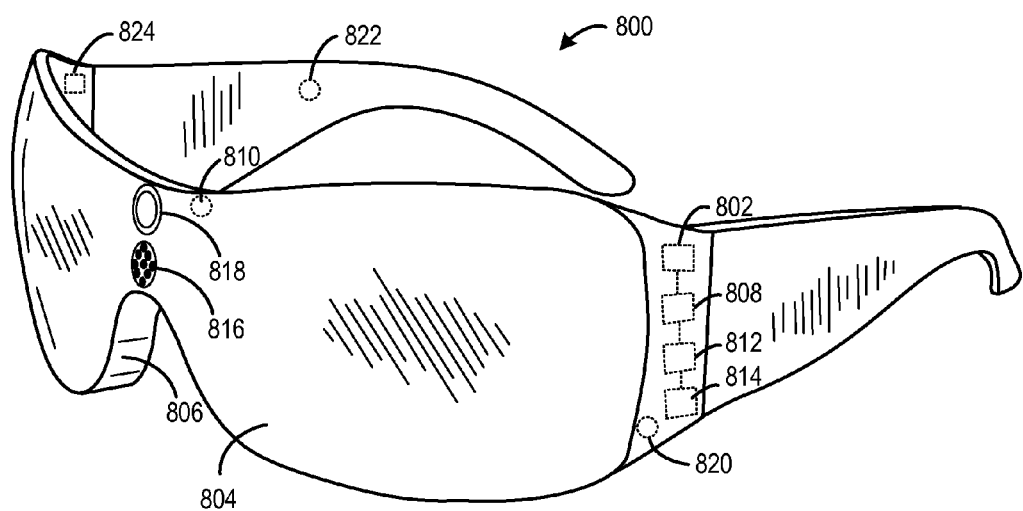
FIG. 8 schematically shows an example head-mounted display device according to an embodiment of the present disclosure.

With reference now to FIG. 8, one example of an HMD device 800 in the form of a pair of wearable glasses with a transparent display is provided. It will be appreciated that in other examples, the HMD device 800 may take other suitable forms in which a transparent, semi-transparent, and/or non-transparent display is supported in front of a viewer's eye or eyes. It will also be appreciated that the HMD devices shown in FIGS. 1 and 2 may take the form of the HMD device 800, as described in more detail below, or any other suitable HMD device.

The HMD device 800 includes a display system 802 and a see-through or transparent display 804 that enables images such as holographic objects to be delivered to the eyes of a wearer of the HMD device. The transparent display 804 may be configured to visually augment an appearance of a real-world, physical environment to a wearer viewing the physical environment through the transparent display. For example, the appearance of the physical environment may be augmented by graphical content (e.g., one or more pixels each having a respective color and brightness) that is presented via the transparent display 804 to create an augmented reality environment.

The transparent display 804 may also be configured to enable a wearer of the HMD device to view a physical, real-world object in the physical environment through one or more partially transparent pixels that are displaying a virtual object representation. As shown in FIG. 8, in one example the transparent display 804 may include image-producing elements located within lenses 806 (such as, for example, a see-through Organic Light-Emitting Diode (OLED) display). As another example, the transparent display 804 may include a light modulator on an edge of the lenses 806. In this example, the lenses 806 may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating an augmented reality environment.

The HMD device 800 may also include various sensors and related systems. For example, the HMD device 800 may include a gaze tracking system 808 that includes one or more image sensors configured to acquire image data in the form of gaze tracking data from a wearer's eyes. Provided the wearer has consented to the acquisition and use of this information, the gaze tracking system 808 may use this information to track a position and/or movement of the wearer's eyes.

In one example, the gaze tracking system 808 includes a gaze detection subsystem configured to detect a direction of gaze of each eye of a wearer. The gaze detection subsystem may be configured to determine gaze directions of each of a wearer's eyes in any suitable manner. For example, the gaze detection subsystem may comprise one or more light sources, such as infrared light sources, configured to cause a glint of light to reflect from the cornea of each eye of a wearer. One or more image sensors may then be configured to capture an image of the wearer's eyes.

Images of the glints and of the pupils as determined from image data gathered from the image sensors may be used to determine an optical axis of each eye. Using this information, the gaze tracking system 808 may then determine a direction the wearer is gazing. The gaze tracking system 808 may additionally or alternatively determine at what physical or virtual object the wearer is gazing. Such gaze tracking data may then be provided to the HMD device 800.

It will also be understood that the gaze tracking system 808 may have any suitable number and arrangement of light sources and image sensors. For example and with reference to FIG. 8, the gaze tracking system 808 of the HMD device 800 may utilize at least one inward facing sensor 810.

The HMD device 800 may also include sensor systems that receive physical environment data from the physical environment. For example, the HMD device 800 may also include a head tracking system 812 that utilizes one or more pose sensors, such as pose sensors 814 on HMD device 800, to capture head pose data and thereby enable position tracking, direction/location and orientation sensing, and/or motion detection of the wearer's head. Accordingly and as noted above, the head tracking system 812 may receive sensor data from pose sensors 814 that enable the orientation of the HMD device 800 to be estimated in three degrees of freedom or the location and orientation of the HMD device to be estimated in six degrees of freedom.

In one example, head tracking system 812 may comprise an inertial measurement unit (IMU) configured as a three-axis or three-degree of freedom position sensor system. This example position sensor system may, for example, include three gyroscopes to indicate or measure a change in orientation of the HMD device 800 within 3D space about three orthogonal axes (e.g., x, y, and z, or roll, pitch, and yaw). The orientation derived from the sensor signals of the IMU may be used to display, via the transparent display 804, one or more virtual objects with a body-locked position in which the position of each virtual object appears to be fixed relative to the wearer of the see-through display and the position of each virtual object appears to be moveable relative to real-world objects in the physical environment.

In another example, head tracking system 812 may comprise an IMU configured as a six-axis or six-degree of freedom position sensor system. This example position sensor system may, for example, include three accelerometers and three gyroscopes to indicate or measure a change in location of the HMD device 800 along the three orthogonal axes and a change in device orientation about the three orthogonal axes.

The head tracking system 812 may also support other suitable positioning techniques, such as GPS or other global navigation systems. Further, while specific examples of position sensor systems have been described, it will be appreciated that any other suitable position sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

In some examples, the HMD device 800 may also include an optical sensor system that utilizes one or more outward facing sensors, such as optical sensor 816 on HMD device 800, to capture image data. The outward facing sensor(s) may detect movements within its field of view, such as gesture-based inputs or other movements performed by a wearer or by a person or physical object within the field of view. The outward facing sensor(s) may also capture 2D image information and depth information from the physical environment and physical objects within the environment. For example, the outward facing sensor(s) may include a depth camera, a visible light camera, an infrared light camera, and/or a position tracking camera.

The optical sensor system may include a depth tracking system that generates depth tracking data via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples, a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. For example, illumination may be provided by an infrared light source 818. It will be appreciated that any other suitable depth camera may be used within the scope of the present disclosure.

The outward facing sensor(s) may capture images of the physical environment in which a wearer of the HMD device is situated. With respect to the HMD device 800, in one example an augmented reality display enhancement program may include a 3D modeling system that uses such captured images to generate a virtual environment that models the physical environment surrounding the wearer of the HMD device. In some embodiments, the optical sensor 816 may cooperate with the IMU to determine the location and the orientation of the HMD device 800 in six degrees of freedom. Such location and orientation information may be used to display, via the transparent display 804, one or more virtual objects with a world-locked position in which a position of each virtual object appears to be fixed relative to real-world objects viewable through the transparent display, and the position of each virtual object appears to be moveable relative to a wearer of the see-through display.

The HMD device 800 may also include a microphone system that includes one or more microphones, such as microphone 820, that capture audio data. In other examples, audio may be presented to the wearer via one or more speakers, such as speaker 822 on the HMD device 800.

The HMD device 800 may also include a controller, such as controller 824. The controller 824 may include a logic subsystem and a storage subsystem, as discussed in more detail below with respect to FIG. 10, that are in communication with the various sensors and systems of the HMD device 800. In one example, the storage subsystem may include instructions that are executable by the logic subsystem to receive signal inputs from the sensors, determine a pose of the HMD device 800, and adjust display properties for content displayed via the transparent display 804.

Figure 9B:
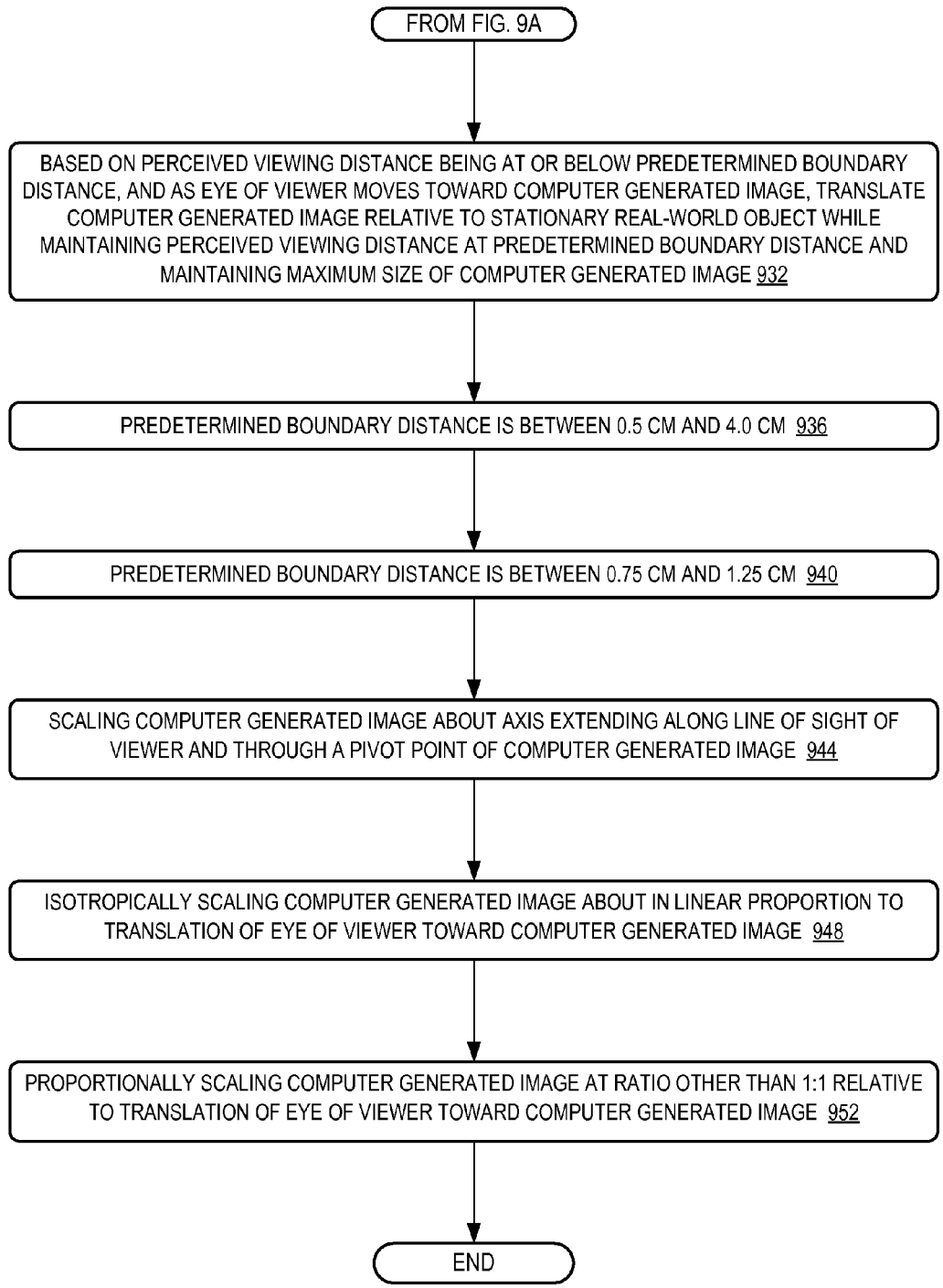

FIGS. 9A and 9B illustrate a flow chart of a method 900 for displaying a computer generated image to a viewer via a stereoscopic display system according to an embodiment of the present disclosure. The following description of method 900 is provided with reference to the software and hardware components described above and shown in FIGS. 1-8. It will be appreciated that method 900 may also be performed in other contexts using other suitable hardware and software components.

With reference to FIG. 9A, at 904 the method 900 may include establishing a predetermined threshold distance from an eye of the viewer to a threshold displayed position of the computer generated image. At 908 the method 900 may include determining that a vergence distance from the eye of the viewer to a current displayed position of the computer generated image is at or below the predetermined threshold distance. At 912 the method 900 may include, based on the vergence distance being at or below the predetermined threshold distance, increasing a size of the computer generated image while maintaining the vergence distance at the predetermined threshold distance as the eye of the viewer moves toward the computer generated image.

At 916 the predetermined threshold distance may be between 50.0 cm and 200.0 cm. At 920 the predetermined threshold distance may between 75.0 cm and 175.0 cm. At 924 the method 900 may include, as the eye of the viewer moves toward the computer generated image and the size of the computer generated image increases, determining that a perceived viewing distance is at or below a predetermined boundary distance from the eye of the viewer to the computer generated image. At 928 the method 900 may include displaying the computer generated image at a maximum size.

With reference now to FIG. 9B, at 932 the method 900 may include, based on the perceived viewing distance being at or below the predetermined boundary distance, and as the eye of the viewer moves toward the computer generated image, translating the computer generated image relative to a stationary real-world object while maintaining the perceived viewing distance at the predetermined boundary distance and maintaining the maximum size of the computer generated image. At 936 the predetermined boundary distance may be between 0.5 cm and 4.0 cm. At 940 the predetermined boundary distance may be between 0.75 cm and 1.25 cm.

At 944 the method 900 may include increasing the size of the computer generated image by scaling the computer generated image about an axis extending along a line of sight of the viewer and through a pivot point of the computer generated image. At 948 the method 900 may include increasing the size of the computer generated image by uniformly scaling the computer generated image in linear proportion to translation of the eye of the viewer toward the computer generated image. At 952 the method 900 may include increasing the size of the computer generated image by proportionally scaling the computer generated image at a ratio other than 1:1 relative to translation of the eye of the viewer toward the computer generated image.

It will be appreciated that method 900 is provided by way of example and is not meant to be limiting. Therefore, it is to be understood that method 900 may include additional and/or alternative steps than those illustrated in FIGS. 9A and 9B. Further, it is to be understood that method 900 may be performed in any suitable order. Further still, it is to be understood that one or more steps may be omitted from method 900 without departing from the scope of this disclosure.

Figure 10:
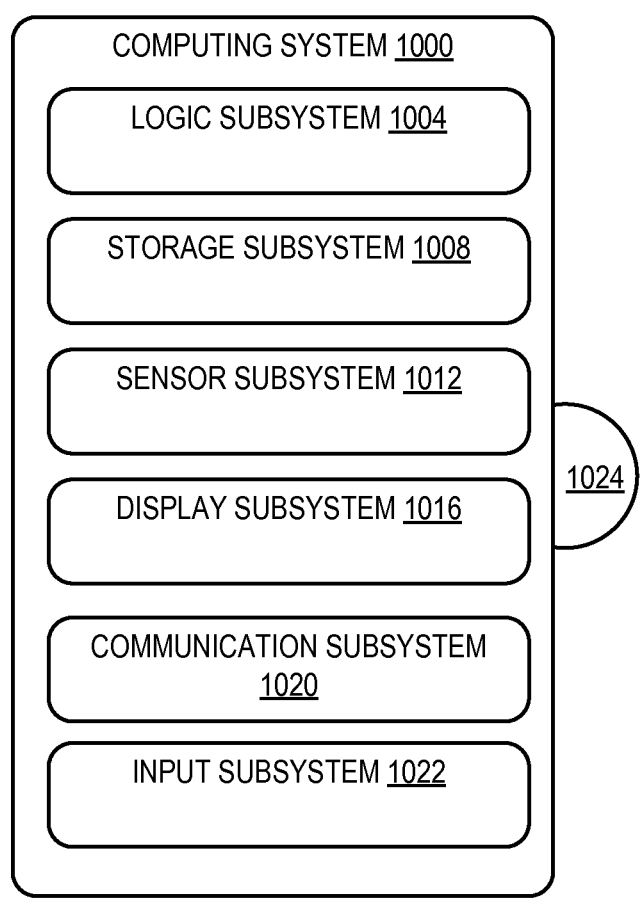
FIG. 10 is a simplified schematic illustration of an embodiment of a computing device.

FIG. 10 schematically shows a nonlimiting example of a computing system 1000 that may perform one or more of the above described methods and processes. Computing device 10 and computing device 12 may take the form of or include one or more aspects of computing system 1000. Computing system 1000 is shown in simplified form. It is to be understood that virtually any computer architecture may be used without departing from the scope of this disclosure. In different examples, computing system 1000 may take the form of a mainframe computer, server computer, desktop computer, tablet computer, home entertainment computer, network computing device, tablet, notebook, smartphone, or other mobile computing device, mobile communication device, gaming device, etc.

As shown in FIG. 10, computing system 1000 includes a logic subsystem 1004 and a storage subsystem 1008. Computing system 1000 may optionally include a sensor subsystem 1012, display subsystem 1016, communication subsystem 1020, input subsystem 1022 and/or other subsystems and components not shown in FIG. 10. Computing system 1000 may also include computer readable media, with the computer readable media including computer readable storage media and computer readable communication media. Computing system 1000 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 1004 may include one or more physical devices configured to execute one or more instructions. For example, the logic subsystem 1004 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 1004 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 1008 may include one or more physical, persistent devices configured to hold data and/or instructions executable by the logic subsystem 1004 to implement the herein described methods and processes. When such methods and processes are implemented, the state of storage subsystem 1008 may be transformed (e.g., to hold different data).

Storage subsystem 1008 may include removable media and/or built-in devices. Storage subsystem 1008 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 1008 may include devices with one or more of the following characteristics: volatile, nonvolatile, dynamic, static, read/write, read-only, random access, sequential access, location addressable, file addressable, and content addressable.

In some examples, aspects of logic subsystem 1004 and storage subsystem 1008 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 10 also shows an aspect of the storage subsystem 1008 in the form of removable computer readable storage media 1024, which may be used to store data and/or instructions executable to implement the methods and processes described herein. Removable computer-readable storage media 1024 may take the form of CDs, DVDs, HD-DVDs, Blu-Ray Discs, EEPROMs, and/or floppy disks, among others.

It is to be appreciated that storage subsystem 1008 includes one or more physical, persistent devices. In contrast, in some implementations aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, sensor subsystem 1012 may include one or more sensors configured to sense different physical phenomenon (e.g., visible light, infrared light, sound, acceleration, orientation, position, etc.) as described above. Sensor subsystem 1012 may be configured to provide sensor data to logic subsystem 1004, for example. Such data may include gaze tracking information, image information, ambient lighting information, depth information, audio information, position information, motion information, user location information, and/or any other suitable sensor data that may be used to perform the methods and processes described above.

When included, display subsystem 1016 may be used to present a visual representation of data held by storage subsystem 1008. As the above described methods and processes change the data held by the storage subsystem 1008, and thus transform the state of the storage subsystem, the state of the display subsystem 1016 may likewise be transformed to visually represent changes in the underlying data. The display subsystem 1016 may include one or more display devices utilizing virtually any type of technology. Such display devices may be combined with logic subsystem 1004 and/or storage subsystem 1008 in a shared enclosure, or such display devices may be peripheral display devices.

When included, communication subsystem 1020 may be configured to communicatively couple computing system 1000 with one or more networks and/or one or more other computing devices. Communication subsystem 1020 may include wired and/or wireless communication devices compatible with one or more different communication protocols. As nonlimiting examples, the communication subsystem 1020 may be configured for communication via a wireless telephone network, a wireless local area network, a wired local area network, a wireless wide area network, a wired wide area network, etc. In some embodiments, the communication subsystem may allow computing system 1000 to send and/or receive messages to and/or from other devices via a network such as the Internet.

When included, input subsystem 1022 may comprise or interface with one or more sensors or user-input devices such as a game controller, gesture input detection device, voice recognizer, inertial measurement unit, keyboard, mouse, or touch screen. In some embodiments, the input subsystem 1022 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of computing device 10 and computing device 12 that is implemented to perform one or more particular functions. In some cases, such a program may be instantiated via logic subsystem 1004 executing instructions held by storage subsystem 1008. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for displaying a computer generated image to a viewer via a stereoscopic display system, the method comprising:
    establishing a predetermined threshold distance from an eye of the viewer to a viewer perceived threshold displayed position of the computer generated image;
    determining that a vergence distance from the eye of the viewer to a viewer perceived current displayed position of the computer generated image is at or below the predetermined threshold distance, wherein the vergence distance is the distance between the eye of the viewer and a predetermined location associated with the image; and
    based on the vergence distance being at or below the predetermined threshold distance, increasing a size of the computer generated image while maintaining the vergence distance at the predetermined threshold distance as the eye of the viewer moves toward the viewer perceived threshold displayed position of the computer generated image.

2. The method of claim 1, wherein the predetermined threshold distance is between 50.0 cm and 200.0 cm.

3. The method of claim 1, wherein the predetermined threshold distance is between 75.0 cm and 175.0 cm.

4. The method of claim 1, further comprising:
    as the eye of the viewer moves toward the viewer perceived threshold displayed position of the computer generated image and the size of the computer generated image increases, determining that a perceived viewing distance is at or below a predetermined boundary distance from the eye of the viewer to the computer generated image;
    displaying the computer generated image at a maximum size; and
    based on the perceived viewing distance being at or below the predetermined boundary distance, and as the eye of the viewer moves toward the viewer perceived threshold displayed position of the computer generated image, translating a viewer perceived position of the computer generated image relative to a stationary real-world object while maintaining the perceived viewing distance at the predetermined boundary distance and maintaining the maximum size of the computer generated image.

5. The method of claim 4, wherein the predetermined boundary distance is between 0.5 cm and 4.0 cm.

6. The method of claim 4, wherein the predetermined boundary distance is between 0.75 cm and 1.25 cm.

7. The method of claim 1, wherein increasing the size of the computer generated image further comprises scaling the computer generated image about an axis extending along a line of sight of the viewer and through a pivot point of the computer generated image.

8. The method of claim 1, wherein increasing the size of the computer generated image further comprises uniformly scaling the computer generated image in linear proportion to translation of the eye of the viewer toward the computer generated image.

9. The method of claim 1, wherein increasing the size of the computer generated image further comprises proportionally scaling the computer generated image at a ratio other than 1:1 relative to translation of the eye of the viewer toward the computer generated image.

10. A head-mounted display device configured to display a computer generated image to a viewer via a stereoscopic display system, the head-mounted display device comprising:
    a computing device; and
    a display enhancement program executed by a processor of the computing device, the display enhancement program configured to:
    establish a predetermined threshold distance from an eye of the viewer to a viewer perceived threshold displayed position of the computer generated image;
    determine that a vergence distance from the eye of the viewer to a viewer perceived current displayed position of the computer generated image is at or below the predetermined threshold distance, wherein the vergence distance is the distance between the eye of the viewer and a predetermined location associated with the image; and
    based on the vergence distance being at or below the predetermined threshold distance, increasing a size of the computer generated image while maintaining the current vergence distance at the predetermined threshold distance as the eye of the viewer moves toward the viewer perceived threshold displayed position of the computer generated image.

11. The head-mounted display device of claim 10, wherein the predetermined threshold distance is between 50.0 cm and 200.0 cm.

12. The head-mounted display device of claim 10, wherein the predetermined threshold distance is between 75.0 cm and 175.0 cm.

13. The head-mounted display device of claim 10, wherein the display enhancement program is further configured to:
- as the eye of the viewer moves toward the viewer perceived threshold displayed position of the computer generated image and the size of the computer generated image increases, determine that a perceived viewing distance is at or below a predetermined boundary distance from the eye of the viewer to the computer generated image;
- display the computer generated image at a maximum size; and
- based on the perceived viewing distance being at or below the predetermined boundary distance, and as the eye of the viewer moves toward the viewer perceived threshold displayed position of the computer generated image, translate a viewer perceived position of the computer generated image relative to a stationary real-world object while maintaining the perceived viewing distance at the predetermined boundary distance and maintaining the maximum size of the computer generated image.

14. The head-mounted display device of claim 13, wherein the predetermined boundary distance is between 0.5 cm and 4.0 cm.

15. The head-mounted display device of claim 13, wherein the predetermined boundary distance is between 0.75 cm and 1.25 cm.

16. The head-mounted display device of claim 10, wherein increasing the size of the computer generated image further comprises scaling the computer generated image about an axis extending along a line of sight of the viewer and through a pivot point of the computer generated image.

17. The head-mounted display device of claim 10, wherein increasing the size of the computer generated image further comprises uniformly scaling the computer generated image in linear proportion to translation of the eye of the viewer toward the computer generated image.

18. The head-mounted display device of claim 10, wherein increasing the size of the computer generated image further comprises proportionally scaling the computer generated image at a ratio other than 1:1 relative to translation of the eye of the viewer toward the computer generated image.

19. The head-mounted display device of claim 10, further comprising a plurality of sensors selected from the group consisting of a depth sensor, an optical sensor, a gyroscope, and an accelerometer.

20. A method for displaying a computer generated image to a viewer via a stereoscopic display system, the method comprising:
- establishing a predetermined threshold distance from an eye of the viewer to a viewer perceived threshold displayed position of the computer generated image;
- determining that a vergence distance from the eye of the viewer to a viewer perceived current displayed position of the computer generated image is at or below the predetermined threshold distance, wherein the vergence distance is the distance between the eye of the viewer and a predetermined location associated with the image;
- based on the vergence distance being at or below the predetermined threshold distance, increasing a size of the computer generated image while maintaining the vergence distance at the predetermined threshold distance as the eye of the viewer moves toward the viewer perceived threshold displayed position of the computer generated image;
- determining that a perceived viewing distance is at or below a predetermined boundary distance from the eye of the viewer to the computer generated image;
- displaying the computer generated image at a maximum size; and
- based on the perceived viewing distance being at or below the predetermined boundary distance, and as the eye of the viewer moves toward the viewer perceived threshold displayed position of the computer generated image, translating a viewer perceived position of the computer generated image relative to a stationary real-world object while maintaining the perceived viewing distance at the predetermined boundary distance and maintaining the maximum size of the computer generated image.

* * * * *